US011119553B2

(12) United States Patent
Truong et al.

(10) Patent No.: US 11,119,553 B2
(45) Date of Patent: Sep. 14, 2021

(54) POWER STATE RECORDATION

(71) Applicant: HEWLETT-PACKARD DEVELOPMENT COMPANY, L.P., Spring, TX (US)

(72) Inventors: Binh T Truong, Spring, TX (US); Jeffrey P Kenline, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/341,257

(22) PCT Filed: Feb. 8, 2017

(86) PCT No.: PCT/US2017/016973
§ 371 (c)(1),
(2) Date: Apr. 11, 2019

(87) PCT Pub. No.: WO2018/147841
PCT Pub. Date: Aug. 16, 2018

(65) Prior Publication Data
US 2020/0050250 A1 Feb. 13, 2020

(51) Int. Cl.
*G06F 9/44* (2018.01)
*G06F 1/28* (2006.01)
*G06F 9/4401* (2018.01)

(52) U.S. Cl.
CPC .............. *G06F 1/28* (2013.01); *G06F 9/4401* (2013.01)

(58) Field of Classification Search
None
See application file for complete search history.

(56) References Cited

U.S. PATENT DOCUMENTS

| 2003/0217153 | A1* | 11/2003 | Rao | G06Q 10/087 |
|---|---|---|---|---|
| | | | | 709/226 |
| 2010/0281309 | A1* | 11/2010 | Laurenti | G06F 11/3055 |
| | | | | 714/45 |
| 2014/0089743 | A1* | 3/2014 | Meir | G06F 1/30 |
| | | | | 714/47.3 |
| 2016/0378603 | A1* | 12/2016 | Herzi | G06F 11/1417 |
| | | | | 714/6.12 |
| 2018/0232521 | A1* | 8/2018 | Jeansonne | G06F 21/52 |

OTHER PUBLICATIONS

Sinha, S. et al, UPnP Low Power Architecture, Aug. 28, 2007, <http://upnp.org/specs/Ip/UPnP-Ip-LPArchitecture-v1.pdf>.

* cited by examiner

*Primary Examiner* — Fahmida Rahman
(74) *Attorney, Agent, or Firm* — Brooks Cameron & Huebsch PLLC

(57) ABSTRACT

Example implementations relate to power state recordation. An example controller can receive notification of a power state event at a computing device, determine a manner in which the power state event occurred, record the manner to the memory resource, and provide a report of the recorded manner.

14 Claims, 3 Drawing Sheets

POWER STATE RECORDATION

BACKGROUND

Power management is a feature of electrical appliances, including computing devices and computer peripherals such as monitors and printers that turns off the power or switches the system to a low-power state when inactive. Power management may use an Advanced Configuration and Power Interface (ACPI) specification.

DETAILED DESCRIPTION

Transitioning a computing device, such as a personal computer, tablet, laptop, and/or notebook, among others, to a different power state can occur in a plurality of manners. A power state can include, for instance, a power on state, a power off state, a sleep state, and/or a standby state, among others. For instance, a computing device can be transitioned to a power state via an application trigger, power button activation, power off override, placing the computing device into a sleep mode, activating a touch screen device on power-on self-test (POST), activating a preboot execution environment (PXE) boot, alternating current (AC) unplug, thermal causes, cold shutdown, etc. The transition to or from a power state can be referred to as a power state event. How the transition occurred can be referred to as the manner.

Some approaches to power state recordation include logging an event viewer application to determine a time-stamp that a generic shutdown event occurred or that a thermal event occurred. These approaches do not list what triggered the generic shutdown event.

In contrast, examples of the present disclosure can record and monitor a power state event. For instance, how a computing device entered into a power state can be determined and recorded and power state event history of the computing device can be tracked. In some instances, this recorded and tracked information can be used to determine if the computing device has been intentionally tampered with or if the power state event was unintentional. The recorded and tracked information can be used for debugging in apparent power-related computing device issues, it may also be used by retailers, for instance, to track power state events occurring during particular employee shifts.

Figure 1:
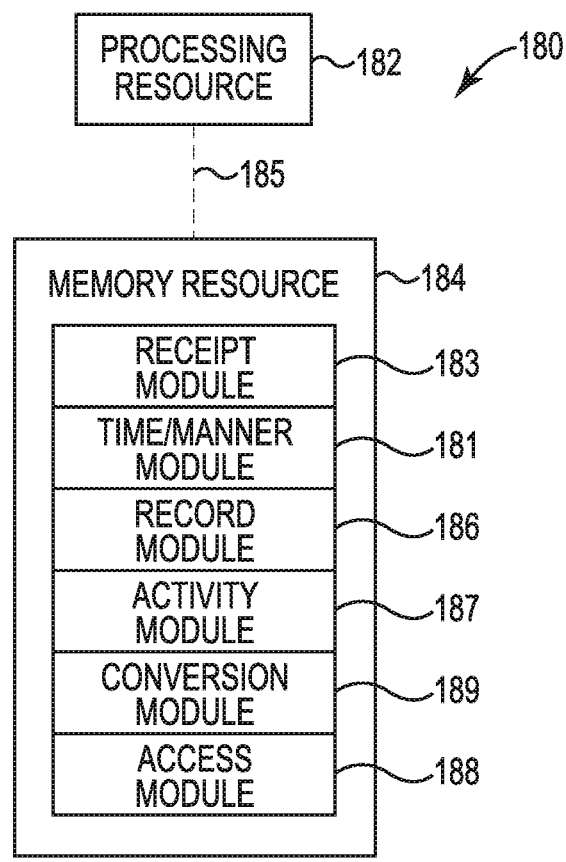
FIG. 1 illustrates a diagram of a computing system including a processing resource, a memory resource, and a number of modules according to an example.

FIG. 1 illustrates a diagram of a computing system 180 including a processing resource 182, a memory resource 184, and a number of modules 183, 181, 186, 187, 189, 188 according to an example. The computing system 180 can utilize instructions (e.g., software and/or firmware) hardware, and/or logic to perform a number of functions including those described herein. The computing system 180 can be a combination of hardware and program instructions configured to share information. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 382 can be implemented in a single device or distributed across multiple devices. The program instructions (e.g., machine-readable instructions (MRI)) can include instructions stored on the memory resource 184 and executable by the processing resource 182 to implement a desired function (e.g., power state recordation).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 183, 181, 186, 187, 189, 188 can include MRI that when executed by the processing resource 182 can perform a number of functions including those described herein. The number of modules 183, 181, 186, 187, 189, 188 can be sub-modules of other modules. For example, the receipt module 183 and the record module 186 can be sub-modules and/or contained within the same computing system. In another example, the number of modules 183, 181, 186, 187, 189, 188 can comprise individual modules at separate and distinct locations (e.g., MRM, etc.).

Each of the number of modules 183, 181, 186, 187, 189, 188 can include instructions that when executed by the processing resource 182 can function as a corresponding engine. For example, the receipt module 183 can include instructions that when executed by the processing resource 182 can function as a receipt engine. Similar, each of the number of modules 183, 181, 186, 187, 189, 188 can include instructions that when executed by the processing resource 182 can function as engines.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 183, 181, 186, 187, 189, 188 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

In an example, receipt module 183 can include instructions that when executed by the processing resource 182 can cause a computing system to receive notification of a plurality of power state events associated with the computing system. For instance notification of a power on event, power off event, a standby mode event, a hibernate event, sleep event, etc. may be received. As used herein, a power on event can include a manner by which a computing device is powered on. A power off event can include a manner by which a computing device is powered off. A standby mode event, a hibernate event, and a sleep event can include manners by which each of these events occurs.

Time/manner module 181 can include instructions that when executed by the processing resource 182 can cause a computing system to determine a time and manner of in which each of the plurality of power state events occurred. Record module 186 can include instructions that when executed by the processing resource 182 can cause a computing system to record to a non-volatile memory resource the determined times and the determined manners. For instance, a basic input/output system (BIOS) can be used to determine and record a date, time, and manner of transition for each power state event. The non-volatile memory resource can be a secure non-volatile memory resource.

For instance, the manners can include a power button being manually pressed "on", and this can be determined using a system management interrupt (SMI) generated by the power button to record the power state event prior to generating the SCI for operating system (OS) use. In some instance, this can include recording power state events including standby, sleep (e.g., S1, S2, S3), hibernate (or S4), and/or shutdown (or S5). Restart can be recorded by trapping an input/output (I/O) cycle to a particular port (e.g., port 92h). In some examples, the power on events are determined using the BIOS, and can include a warm boot, cold boot, and network boot, among others.

Activity module 187 can include instructions that when executed by the processing resource 182 can cause a computing system to determine activities of the computing system before and after each of the plurality of power state events based on the determined times and the determined manners. In some examples, the activities can include hardware changes in the computing system. For instance, it can be determined if a USB flash drive has been inserted into the computing device following a shutdown power state event or before a restart power state event. This may indicate tampering with the computing device, for instance. In some examples, a history of the recorded times, the recorded manners, and the determined activities can be created and stored to the non-volatile memory resource.

Conversion module 189 can include instructions that when executed by the processing resource 182 can cause a computing system to convert the determined times, the determined manners, and the determined activities to a human-readable event report, and access module 188 can include instructions that when executed by the processing resource 182 can cause a computing system to provide reading access to the event report. For instance, reading access to the human-readable event report can be provided via an interface into the BIOS to a user and/or manageability application. An example interface includes Windows Management Instrumentation (WMI); however, other operating system interfaces can be used to provide access to the human-readable report, as well as registries and/or file bases.

Figure 2:
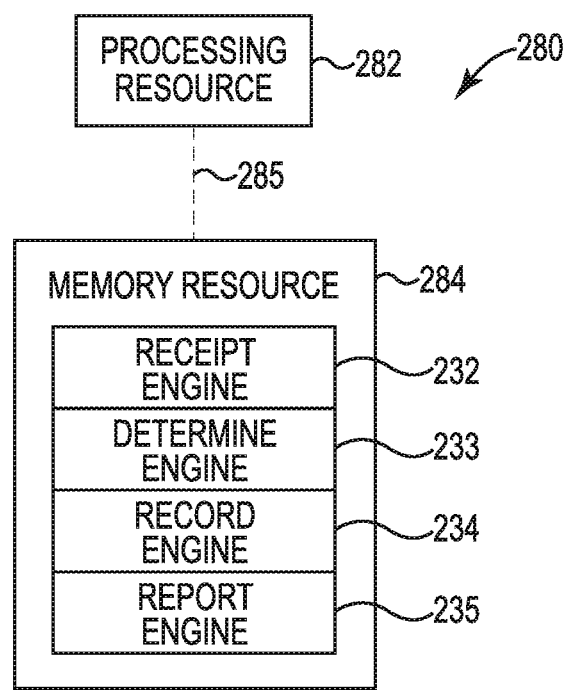
FIG. 2 illustrates a diagram of a controller including a processing resource, a memory resource, and a number of modules according to an example.

FIG. 2 illustrates a diagram of an example controller 230 including a processing resource 282, a memory resource 284, and a number of engines 232, 233, 234, 235 according to an example. For example, the controller 230 can be a combination of hardware and instructions for power state recordation. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., power state recordation). The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes a number of engines (e.g., receipt engine 232, determine engine 233, record engine 234, report engine 235). The memory resource 284 can include additional or fewer engines than illustrated to perform the various functions described herein.

The number of engines can include a combination of hardware and instructions to perform a number of functions described herein (e.g., determining cash drawer access). The instructions (e.g., software, firmware, etc.) can be downloaded and stored in a memory resource (e.g., MRM) as well as a hard-wired program (e.g., logic), among other possibilities.

The receipt engine 232 can receive notification of a power state event at a computing device, and the determine engine 233 can determine a manner in which the power state event occurred. The power state event can include a power off event, a sleep event, a standby event, a power on event, a touch screen activation event, and/or a PXE boot event, among others.

The record engine 234 can record the manner to the memory resource. For instance, using an advanced configuration and power interface (ACPI), because the BIOS makes SMI calls to support a plurality of the power state events (e.g., 4-second shutdown, sleeps modes, functionalities during POST (e.g., boot to PXE, enable pre-touch, etc.)), the BIOS can port the power state events to a non-volatile memory resource where it can be subsequently ported to a readable database (e.g., WMI table) via an interface into the BIOS. In some instances, this porting can occur during a subsequent boot sequence.

The report engine 235 can provide a report of the recorded manner and can be, for instance, in a human-readable format. In some examples, the report can be accessible by a manageability application, which can read the power state event occurrence and can create a history of the manner, as well as times and dates of the power state event. For example, the controller can include instructions executable to determine a date and/or time at which the power state event occurred, record the date, the time, and the manner to the memory resource, and provide a report of the recorded date, the recorded time, and the recorded manner.

Figure 3:
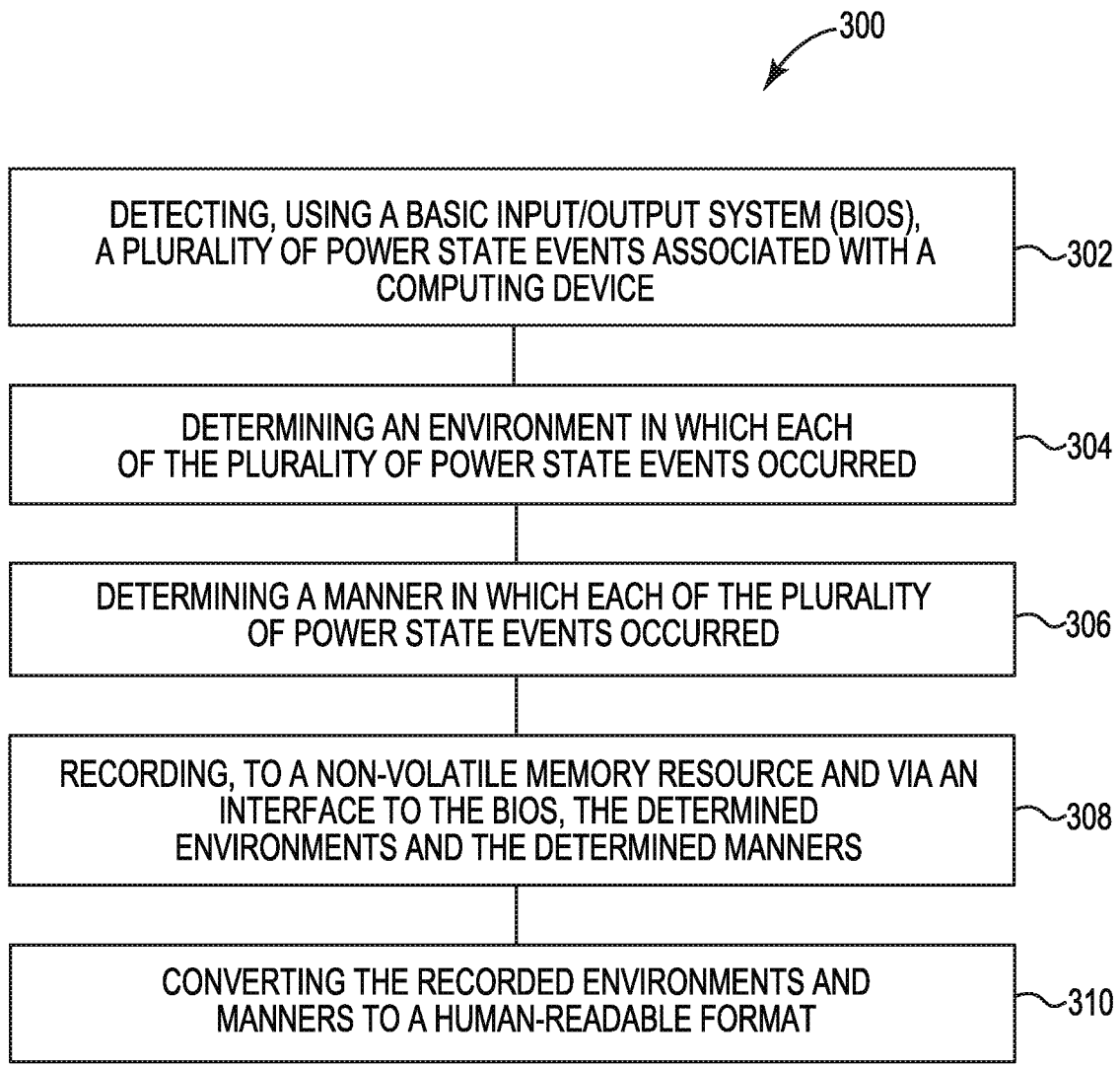
FIG. 3 illustrates a diagram of a method for power state recordation according to an example.

FIG. 3 illustrates a diagram of a method 300 for power state recordation according to an example. At 302, method 300 can include detecting, using a BIOS, a plurality of power state events associated with a computing device. For instance, if a computing system is running, and there is a power state event (e.g., turning off, sleep, etc.), the BIOS can detect the event. In some examples, the BIOS can detect a change in hardware, for instance, the addition of an external memory device (e.g., USB flash drive, external hard drive, etc.).

At 304, method 300 can include determining an environment in which each of the plurality of power state events occurred. As used herein, an environment can include a platform used to host an application or service. In some instances, an environment can include a client-server model that partitions tasks or workloads between servers and clients. Put another way, the environment can include the way in which a server provides resources and services to a client. Alternatively or additionally, an environment can include a system that manages resources and provides services for a computing device. For instance, the environment determined can include a particular operating system, an operating system and/or computing device that is pre-POST, and/or an operating system and/or computing device undergoing POST, among others. Method 300, at 306, can include determining a manner in which each of the plurality of power state events occurred. As used herein, a manner can include how a power state transition occurred, including a press of a computing device power button. The manner can include, for instance, a 4-second press, an under 1-second press, and/or a double press within 2 seconds, among others as previously discussed herein.

At 308, method 300 can include recording, to a non-volatile memory resource and via an interface to the BIOS, the determined environments and the determined manners. For instance, the recorded information can be ported to a non-volatile memory resource via BIOS, as BIOS makes SMI calls to support a plurality of the power state events. For instance, in some examples, an SMI generated by a power button of the computing device can be used to record a power state event of the plurality of power state events prior to generating a system control interrupt.

In some instances, recording the determined manners can include recording a power state event of the plurality of power state events by trapping an I/O cycle. For example, a restart power event can be recorded by trapping the I/O cycle to port 92h.

At 310, method 300 can include converting the recorded environments and manners to a human-readable format. For example, method 300 can include porting, via the BIOS, the recorded environments and manners to a readable database (e.g., WMI table). In such an example, porting can include writing a variable into the non-volatile memory resource, and the variable can record and store the converted recorded environments and manners. Times and dates of power state events can be recorded and stored, as well. The recorded information can then be provided to a user via an interface into the BIOS by removing the variable, decompressing the data, and converting it to a human-readable report including a history of power state events.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A controller comprising a processing resource and a memory resource, wherein the processing resource is in communication with the memory resource and the memory resource includes instructions executable by the processing resource, the controller is configured to:
   detect a power state event using a basic input/output system (BIOS) of a computing device, wherein the BIOS is running on the computing device;
   determine, using the BIOS, a date and time at which the power state event occurred and manner of transition in which the power state event occurred,
      wherein the manner of transition comprises how the transition to or from the power state event occurred;
   determine, using the BIOS, an environment in which the power state event occurred, wherein the environment comprises a system that manages resources and provides services for the controller;
   record the date, environment, and time to the memory resource and via an interface to the BIOS;
   trap an input/output (I/O) cycle to a particular I/O port of the computing device;
   record the manner of transition to the BIOS responsive to trapping the I/O cycle; and
   provide a report of the recorded date, environment, time, and manner of transition.

2. The controller of claim 1, further comprising instructions executable to record the date, time, and the manner of transition during a subsequent boot sequence.

3. The controller of claim 1, wherein the determined manner of transition is a press of a power button of the computing device.

4. The controller of claim 1, wherein the press of the power button comprises at least one of a 4-second press, an under 1-second press, or a double press within 2 seconds.

5. The controller of claim 1, wherein the power state event is at least one of a power off event, a sleep event, a standby event, a power on event, a touch screen activation event, and a preboot execution environment boot event.

6. The controller of claim 1, wherein the report is in a human-readable format.

7. The controller of claim 1, wherein the report is accessible by a manageability application.

8. A non-transitory machine-readable medium storing instructions executable by a processing resource to cause a computing system to:
- detect a plurality of power state events using a basic input/output system (BIOS) of the computing system, the BIOS is running on the computing system;
- determine, using the BIOS, a date and time at which each of the plurality of power state events occurred and manner of transition in which each of the plurality of power state events occurred,
  - wherein the manner of transition comprises how the transition to or from each of the plurality of power state events occurred;
- determine, using the BIOS, an environment in which each of the plurality of power state events occurred, wherein the environment comprises a system that manages resources and provides services for the medium;
- record to a non-volatile memory resource and via an interface to the BIOS, the determined dates, the determined times, and the determined environments;
- trap an input/output (I/O) cycle to a particular I/O port of the computing system;
- record the manner of transition for each of the plurality of power state events to the BIOS responsive to trapping the I/O cycle;
- determine activities of the computing system before and after each of the plurality of power state events based on the determined dates, the determined times, the determined environments, and the recorded manners;
- convert the determined dates, the determined times, the determined environments, the recorded manners, and the determined activities to a human-readable event report; and
- provide reading access to the event report.

9. The medium of claim 8, wherein the instructions executable to determine the activities further comprise instructions executable to detect hardware changes in the computing system.

10. The medium of claim 8 further comprising instructions executable to create a history of the recorded dates, the recorded times, the recorded manners, and the determined activities.

11. A method for power state recordation, comprising:
- detecting, using a basic input/output system (BIOS), a plurality of power state events associated with a computing device, wherein the BIOS is running on the computing system;
- determining, using the BIOS, an environment in which each of the plurality of power state events occurred, a date of the occurrence of each of the plurality of power state events, and a time of the occurrence of each of the plurality of power state events,
  - wherein the environment comprises a system that manages resources and provides services for a controller of the computing device;
- determining, using the BIOS, a manner of transition in which each of the plurality of power state events occurred, wherein the manner of transition comprises how the transition to or from each of the plurality of power state events occurred;
- recording, to a non-volatile memory resource and via an interface to the BIOS, the determined environments, the determined dates, and the determined times;
- trapping an input/output (I/O) cycle to a particular I/O port of the computing device;
- recording the manner of transition for each of the plurality of power state events to the BIOS responsive to trapping the I/O cycle; and
- converting the recorded environments, dates, times, and manners to a human-readable format.

12. The method of claim 11, further comprising porting, via the BIOS, the converted recorded environments and manners to a readable database.

13. The method of claim 11, wherein recording the determined manners comprises using a system management interrupt generated by a power button of the computing device to record a power state event of the plurality of power state events prior to generating a system control interrupt.

14. The method of claim 11, wherein determining the environment comprises determining one of a pre-power-on self-test, power-on self-test, and particular operating system environment.

* * * * *